US010605610B2

(12) United States Patent
Cummings

(10) Patent No.: US 10,605,610 B2
(45) Date of Patent: Mar. 31, 2020

(54) APPARATUS AND METHODS FOR REDUCING DATA TRANSMISSION IN WIRELESS CLIENT-SERVER NAVIGATION SYSTEMS

(76) Inventor: Ian Cummings, Ypsilanti, MI (US)

( * ) Notice: Subject to any disclaimer, the term of this patent is extended or adjusted under 35 U.S.C. 154(b) by 535 days.

(21) Appl. No.: 11/697,977

(22) Filed: Apr. 9, 2007

(65) Prior Publication Data

US 2008/0249704 A1 Oct. 9, 2008

(51) Int. Cl.
*G01C 21/26* (2006.01)
(52) U.S. Cl.
CPC .................................. *G01C 21/26* (2013.01)
(58) Field of Classification Search
CPC .................................................... G01C 21/26
USPC ........ 701/208, 211; 341/50; 345/660, 472.1; 382/242, 232; 709/203; 340/286.01, 990
See application file for complete search history.

(56) References Cited

U.S. PATENT DOCUMENTS

| | | | | |
|---|---|---|---|---|
| 5,566,288 | A * | 10/1996 | Koerhsen | 345/442 |
| 5,594,855 | A * | 1/1997 | Von Ehr, II | G06T 11/203 345/442 |
| 5,774,824 | A * | 6/1998 | Streit et al. | 701/446 |
| 6,058,350 | A * | 5/2000 | Ihara | 701/208 |
| 6,311,126 | B1 * | 10/2001 | Katayama et al. | 701/431 |
| 6,597,363 | B1 * | 7/2003 | Duluk et al. | 345/506 |
| 6,674,445 | B1 * | 1/2004 | Chithambaram et al. | 345/619 |
| 6,703,947 | B1 * | 3/2004 | Wallner | 341/50 |
| 6,812,925 | B1 * | 11/2004 | Krishnan et al. | 345/423 |
| 6,954,696 | B2 * | 10/2005 | Ihara et al. | 701/455 |
| 7,088,266 | B2 * | 8/2006 | Watanabe et al. | 340/995.1 |
| 7,164,987 | B2 * | 1/2007 | Watanabe et al. | 701/454 |
| 7,248,965 | B2 * | 7/2007 | Tanizaki et al. | 701/533 |
| 7,340,341 | B2 * | 3/2008 | Adachi | G01C 21/32 340/988 |
| 7,412,362 | B2 * | 8/2008 | Hu et al. | 703/2 |

(Continued)

OTHER PUBLICATIONS

Author: Monika Sester, Claus Brenner Title: Continuous Generalization for Visualization on Small Mobile Devices (2004) In Proc. Conference on Spatial Data Handling, 2005, Part 8, 355-368, DOI: 10.1007/3-540-26772-7_27 Publisher: Springer Berlin Heidelberg.*

(Continued)

*Primary Examiner* — Sze-Hon Kong
(74) *Attorney, Agent, or Firm* — John Maldjian; Maldjian Law Group, LLC

(57) ABSTRACT

Methods and apparatus reduce data transmission in a wireless client-server navigation system. A request for data representative of a map-related feature is received at a server from a mobile unit. Data describing the feature is obtained in the form of line segments interconnecting points having coordinates. An operation is performed on the data to generate data representing the feature in a data-reduced format, and the reduced-format data is forwarded to the mobile unit. The operation may include receiving map data; partitioning the map into tiles; designating a reference point within each tile; representing data points as offsets from the reference points. Alternatively, the operation may include approximating the feature with a curve. In a further alternative embodiment, the operation may include removing one or more of the points such that the feature is represented with line segments interconnecting the remaining points.

11 Claims, 6 Drawing Sheets

(56) References Cited

U.S. PATENT DOCUMENTS

| | | | |
|---|---|---|---|
| 7,493,212 B2 * | 2/2009 | Sumizawa et al. | 701/532 |
| 7,542,882 B2 * | 6/2009 | Agrawala et al. | 703/2 |
| 7,545,382 B1 * | 6/2009 | Montrym et al. | 345/530 |
| 7,620,496 B2 * | 11/2009 | Rasmussen | 701/455 |
| 7,839,306 B2 * | 11/2010 | Tanizaki et al. | 340/995.1 |
| 8,350,873 B2 * | 1/2013 | Sakashita | 345/672 |
| 2002/0029224 A1 * | 3/2002 | Carlsson | 707/104.1 |
| 2002/0097912 A1 * | 7/2002 | Kimmel et al. | 382/199 |
| 2002/0113797 A1 * | 8/2002 | Potter et al. | 345/581 |
| 2003/0063096 A1 * | 4/2003 | Burke | 345/582 |
| 2003/0078720 A1 * | 4/2003 | Adachi | G01C 21/30 701/446 |
| 2003/0158653 A1 * | 8/2003 | Sakai | 701/205 |
| 2003/0231190 A1 * | 12/2003 | Jawerth et al. | 345/660 |
| 2003/0233403 A1 * | 12/2003 | Bae | H04L 67/18 709/203 |
| 2004/0032980 A1 * | 2/2004 | Harman | 382/154 |
| 2004/0150639 A1 * | 8/2004 | Park et al. | 345/419 |
| 2005/0046615 A1 * | 3/2005 | Han | 342/357.06 |
| 2005/0085242 A1 * | 4/2005 | Nishizawa | 455/456.1 |
| 2005/0090974 A1 * | 4/2005 | Hirose | 701/208 |
| 2005/0131642 A1 * | 6/2005 | Adachi | 701/210 |
| 2005/0187711 A1 * | 8/2005 | Agrawala et al. | 701/211 |
| 2006/0106534 A1 * | 5/2006 | Kawamata et al. | 701/208 |
| 2006/0184317 A1 * | 8/2006 | Asahara et al. | 701/208 |
| 2006/0197760 A1 * | 9/2006 | Yamada | G06T 17/20 345/423 |
| 2006/0206623 A1 * | 9/2006 | Gipps | G06Q 10/04 709/238 |
| 2006/0215923 A1 * | 9/2006 | Beatty | 382/253 |
| 2007/0067126 A1 * | 3/2007 | Adachi | 702/86 |
| 2007/0233817 A1 * | 10/2007 | Johnson | G01C 21/005 709/219 |
| 2007/0270692 A1 * | 11/2007 | Barbu | A61B 6/12 600/431 |
| 2008/0046175 A1 * | 2/2008 | Tengler et al. | 701/210 |
| 2008/0059889 A1 * | 3/2008 | Parker | G06F 16/29 715/748 |

OTHER PUBLICATIONS

ESRI Shapefile Technical Description, Jul. 1998, 1998 Environmental Systems Research Institute, Inc, pp. 1-28 (Year: 1998).*

* cited by examiner

| Data transmitted in straight line representation | | |
|---|---|---|
| Point 1 | X coordinate | Y coordinate |
| Point 2 | X coordinate | Y coordinate |
| Point 3 | X coordinate | Y coordinate |
| Point 4 | X coordinate | Y coordinate |
| Point 5 | X coordinate | Y coordinate |
| Point 6 | X coordinate | Y coordinate |
| Point 7 | X coordinate | Y coordinate |
| Point 8 | X coordinate | Y coordinate |
| Point 9 | X coordinate | Y coordinate |
| Point 10 | X coordinate | Y coordinate |
| Point 11 | X coordinate | Y coordinate |
| Point 12 | X coordinate | Y coordinate |
| Point 13 | X coordinate | Y coordinate |
| Point 14 | X coordinate | Y coordinate |
| Point 15 | X coordinate | Y coordinate |
| Point 16 | X coordinate | Y coordinate |
| Point 17 | X coordinate | Y coordinate |

Fig-7A

| Data transmitted in curve construction representation |
|---|
| Parameter 1 |
| Parameter 2 |
| Parameter 3 |
| Parameter 4 |
| Parameter 5 |

Fig-7B

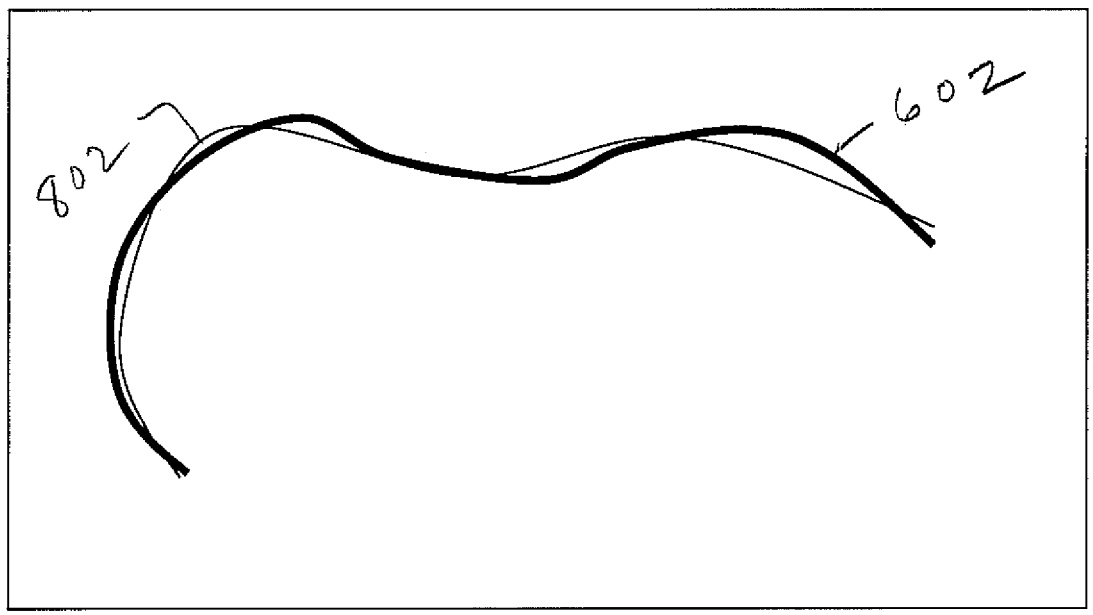

APPARATUS AND METHODS FOR REDUCING DATA TRANSMISSION IN WIRELESS CLIENT-SERVER NAVIGATION SYSTEMS

FIELD OF THE INVENTION

This invention relates generally to navigation systems and, in particular, to apparatus and methods for reducing data transmission in wireless client-server environments.

BACKGROUND OF THE INVENTION

The engineering and business requirements of navigation by wireless client-server (WCS) navigators, in which route searches and map generation are performed at a central location then transmitted to mobile units, differ somewhat from those of standard standalone navigators. One major difference is that for WCS navigators, data transmission costs are a large part of the ongoing cost of operating the navigation system. In order to economically provide WCS navigation, it is important to minimize the amount of data transmitted while still meeting customers' navigation needs.

SUMMARY OF THE INVENTION

This invention is directed to methods and apparatus for reducing data transmission in a wireless client-server navigation system. In the preferred method, a request for data representative of a map-related feature is received at a central server from a mobile unit. Data describing the feature is obtained in the form of line segments interconnecting points having coordinates such as a shapefile or other format. An operation is performed on the data describing the feature to generate data representative of the feature in a data-reduced format, and the data representative of the feature in the data-reduced format is forwarded to the mobile unit issuing the request.

The map-related feature may include a route; a road; a lake, stream, river, ocean or other body of water; other geographic feature; or text. The operation may be performed when the request is received from the mobile unit, or the operation may be performed in advance of the request from the mobile unit, such that the data representative of the feature in the data-reduced format is stored in a memory for later retrieval.

According to one embodiment, the operation responsible for producing the data-reduced format includes the steps of: receiving data describing a map; partitioning the map into a plurality of tiles; designating a reference point within each tile; representing the feature in the form of offsets from the reference points; and wherein the data-reduced format is based upon the reference points and offsets. The tiles may or may not be substantially equal in size, and the offsets may be represented with Cartesian, polar, or any other appropriate coordinates.

Alternatively, the operation may include the steps of approximating the feature with a curve, whereby the data-reduced format includes a description of the curve. The description of the curve may include the coordinates of points along the curve, or a mathematical function, including a Bezier or other spline, a polynomial or fractal curve. In this and in other embodiments a standard may be provided regarding the extent to which the operation will affect the approximation of the feature, such that the operation will only be applied if the standard is met. The standard may be based upon map scale, a user preference, or other factors.

In a further alternative embodiment, the operation includes the steps of removing one or more of the points having the coordinates, leaving a plurality of remaining points describing the feature, such that the reduced-data format is represented with line segments interconnecting the remaining points. In all embodiments, the operation may include, alone or in combination with other embodiments, the step of applying a data-compression algorithm to the data representative of the feature in the data-reduced format prior to forwarding the data to the mobile unit issuing the request. The data-compression algorithm includes the Lempel-Ziv algorithm or a variant or extension thereof, fractal compression or other methodologies.

A wireless client-server navigation system according to the invention includes a mobile unit and a central server. The mobile unit includes a wireless transmitter for transmitting a request for data representative of a map-related feature, a receiver for receiving the data representative of the map-related feature, and a display for displaying the feature on a map. The central server includes an input for receiving data describing map-related features in the form of line segments interconnecting points having coordinates, a receiver for receiving the request from the mobile unit, a processor for performing an operation on the data describing the map-related feature associated with the request by the mobile to generate data representative of the feature in a data-reduced format; and a transmitter for transmitting the data representative of the feature in the data-reduced format to the mobile unit. Other system-level aspects are disclosed and described in detail.

BRIEF DESCRIPTION OF THE DRAWINGS

FIG. 7A is a chart that shows data to be transmitted for the line approximation of FIG. 6.

FIG. 7B is a chart that shows data to be transmitted for the curve approximation of FIG. 6;

FIG. 8 shows a fitted curve as a geographic feature shown to a user;

DETAILED DESCRIPTION OF THE INVENTION

The various embodiments described herein are intended to be used with a wireless client-server (WCS) navigation system. Such a system provides guidance in the form of maps, routes, and/or instructions, and 1) which has mobile clients used for requesting and receiving guidance, 2) which has a central server that houses databases of geographical information, and which generates guidance, and
3) wherein data is transmitted between the mobile clients and central server.

Tiling Embodiment

Figures 1, 2:
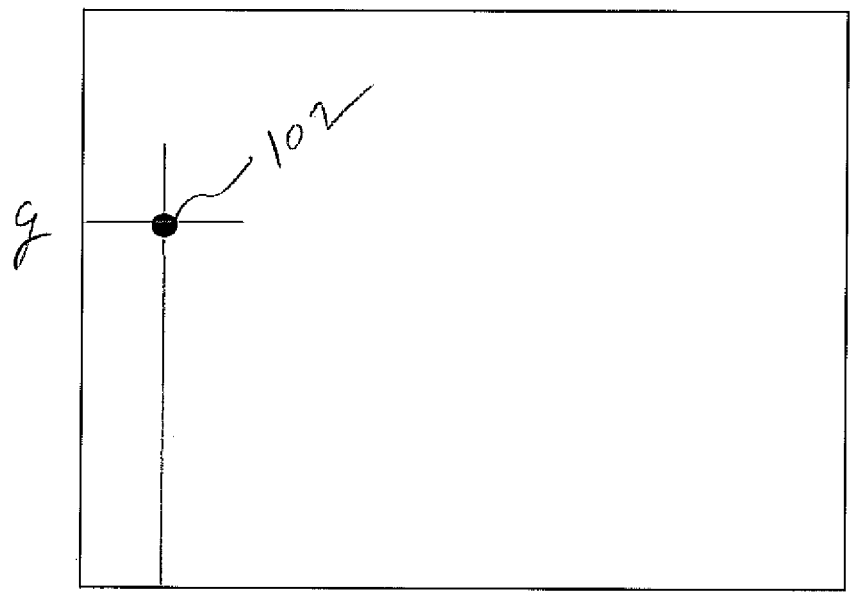
FIG. 1 shows a tile method according to the present invention.
FIG. 2 shows a tile method with a map divided into tiles with reference points.

In existing navigation systems, geographic data is often generated and stored using highly accurate but data-intensive means. For example, in the commonly used shapefile format depicted in FIG. 1, each point 102 is stored as an (x,y) coordinate using the double float data format, requiring a total of 16 bytes.

Figure 3:
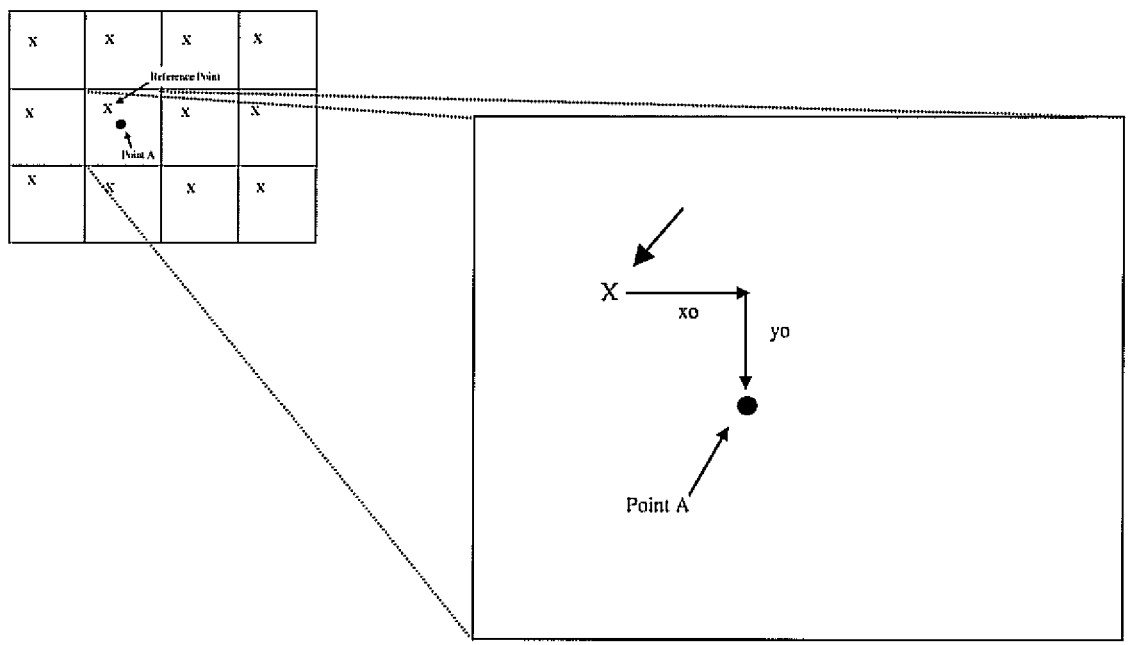
FIG. 3 shows a tile method with Point A being represented as an offset from a reference point.

The tile method according to this invention uses a less data intensive method to preserve required accuracy while minimizing the amount of data transmitted. In the tile method, depicted in FIG. 2, a map is divided into a set of tiles. The tiles are generally of equal size, although this is not necessary. Each tile is assigned a reference point X, and the coordinates of each point A within each tile are then represented as a offset (xo, yo in FIG. 3) from the reference point. The tile method may be applied when a request for a map is received, or a tiled map may be generated then used for future map requests.

As an example of how this could provide benefits in data transmission, suppose points in a map are stored in shapefile format, requiring 16 bytes to represent each point. The map is divided up into tiles measuring one mile east-west by one mile north-south. Further suppose that it has been determined that users of the navigator require no greater resolution than 25 feet; meaning that if a feature is within 25 feet of where their navigator says, then it's good enough for them. A reference point is selected within the tile, and all points within the tile are represented as an offset from the reference location. In a one square mile tile, all locations can be measured as an offset from a reference point to within 25 feet by a set of data including x and y coordinates in 8 bit integer format, requiring 2 bytes total for each point, since 5280 feet/mile divided by 2^8 is 20.625 feet.

In this example, 16 additional bytes of data are required to represent the reference point of each tile, but for each point within the tile, 14 bytes are saved. Thus if there is on average more than one point per tile, an overall reduction in data transmission can be achieved with the specific approach of this example.

The tile method also has the advantage of dividing data to be transmitted into discrete, easily manipulated units of data.

Fitted Curve Embodiment

Figure 4:
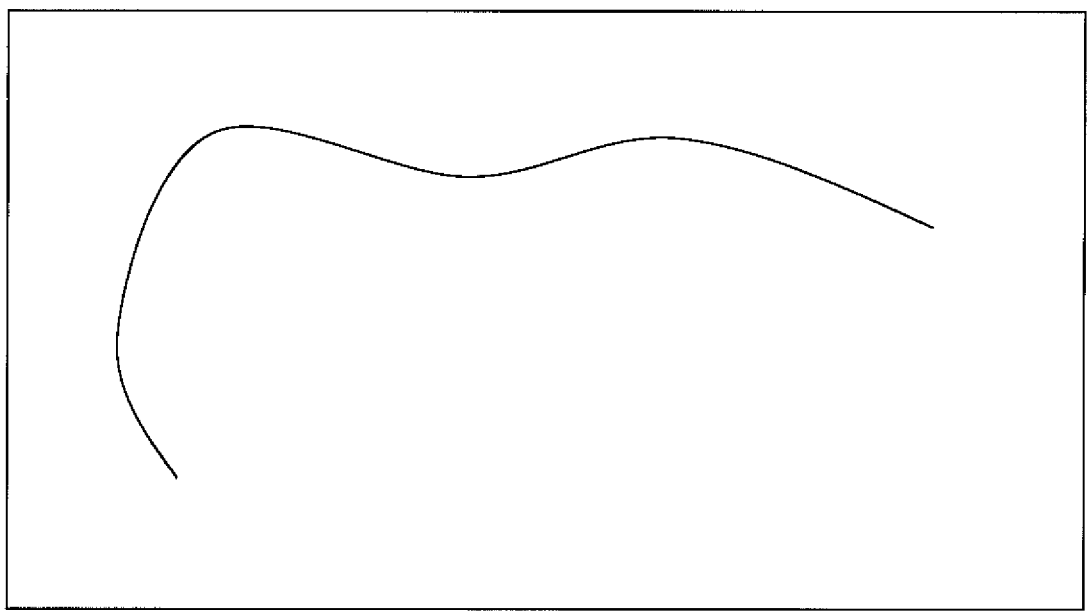
FIG. 4 shows a fitted curve embodiment as a true geographic feature.
Figure 5:
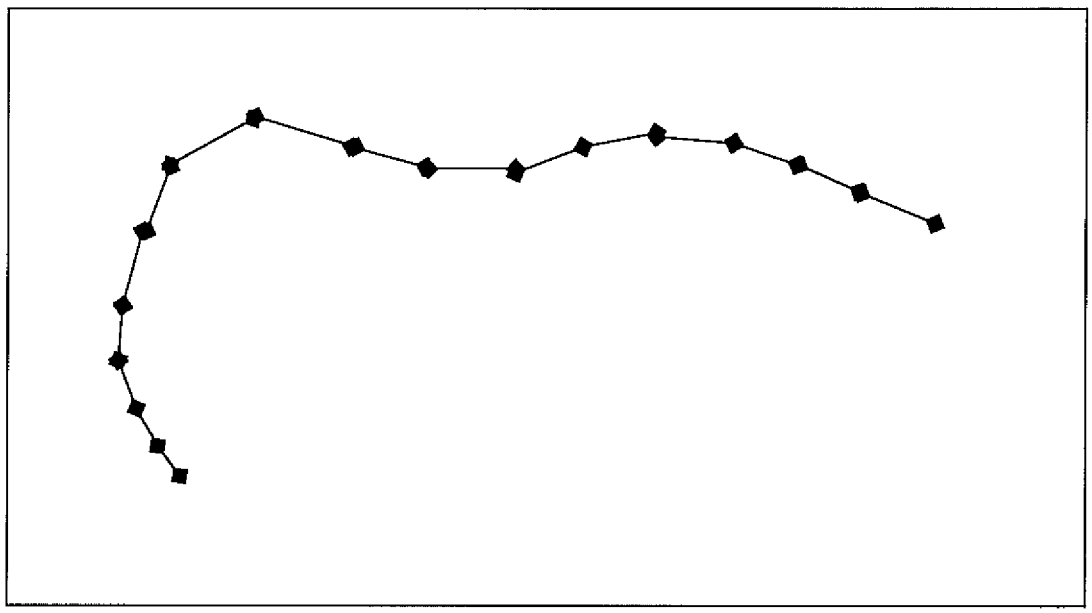
FIG. 5 shows a fitted curve as a line approximation to the geographic feature.

Many standard representations of geographical information are limited to the use of straight lines. When a curve such as that shown in FIG. 4 must be approximated, a large number of straight lines are used instead, as shown in FIG. 5. While this improves the accuracy of the map, in WCS navigators it also greatly increases the amount of map data that must be transmitted.

According to this invention, instead of transmitting all of the points of straight lines representing a curve, the navigation system transmits information from which a curve can be constructed that approximates the lines provided in the geographical information.

Figure 6:
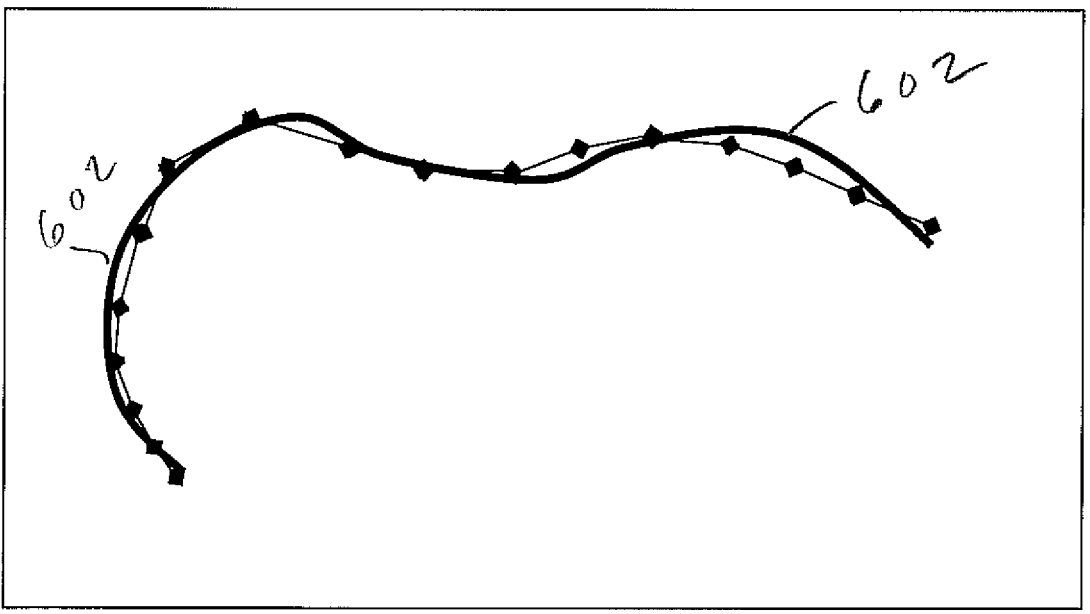
FIG. 6 shows a curve constructed to approximate a route.

In the first step of this method, a curve such as 602 shown in FIG. 6 is generated that approximates lines provided in geographical information. A large number of curve construction methods are possible, including Bezier curves, other splines, polynomial curves, and fractals. This method is not intended to be limited to any particular method of generating curves. A measure of accuracy of the generated curve is defined and used to judge the suitability of the curve.

The information representing the curve is then transmitted from the server to the client. The information may be a set of points along the curve, or it may be another arbitrary representation. The type of curve and information about how it is to be reconstructed may also be transmitted, or it may have been previously provided to the client. The client receives the information and from it constructs a graphical representation of the curve for use of the customer. FIG. 7A is a chart that shows data to be transmitted for line approximation, versus the curve approximation in FIG. 7B. FIG. 8 shows the approximation 602 versus the actual geographic feature 802. Again, information representing the curve may be generated at the time a user requests map information or it may be generated at an earlier time and stored for future use.

Point Removal Embodiment

Figure 9:
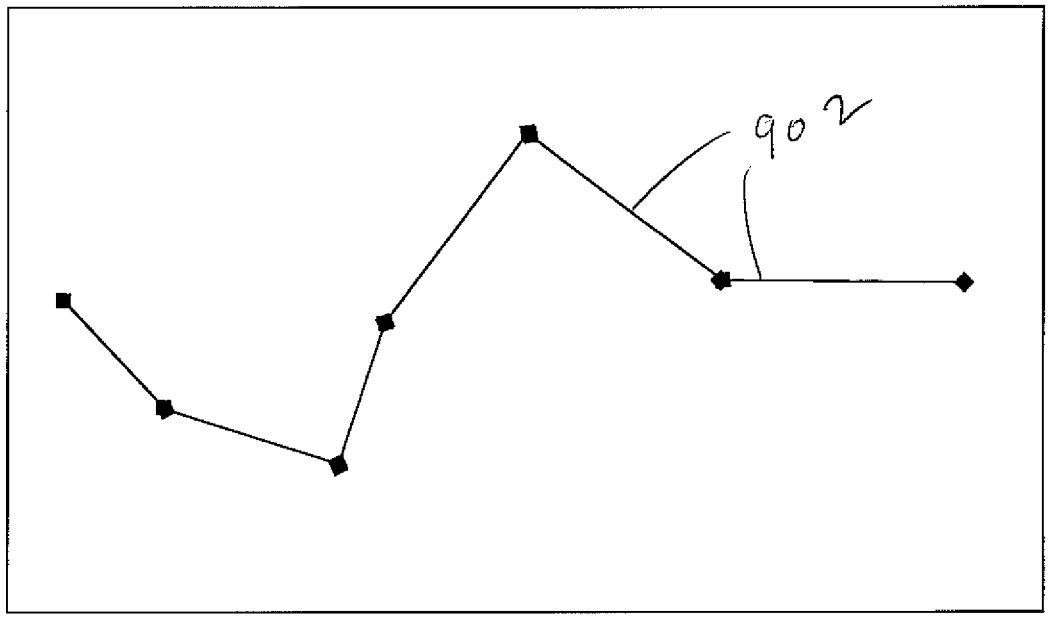
FIG. 9 shows a point removal embodiment according to the invention.

Many standard representations of geographical information are limited to the use of straight lines. When a curve must be approximated, a large number of straight lines 902 are used instead, as shown in FIG. 9. While this improves the accuracy of the map, in WCS navigators it also greatly increases the amount of map data that must be transmitted.

Many customers do not require the full accuracy provided by straight line approximations, particularly when maps are displayed that show large areas. For this reason it is useful to remove points of the representation if geographical data.

Figure 10:
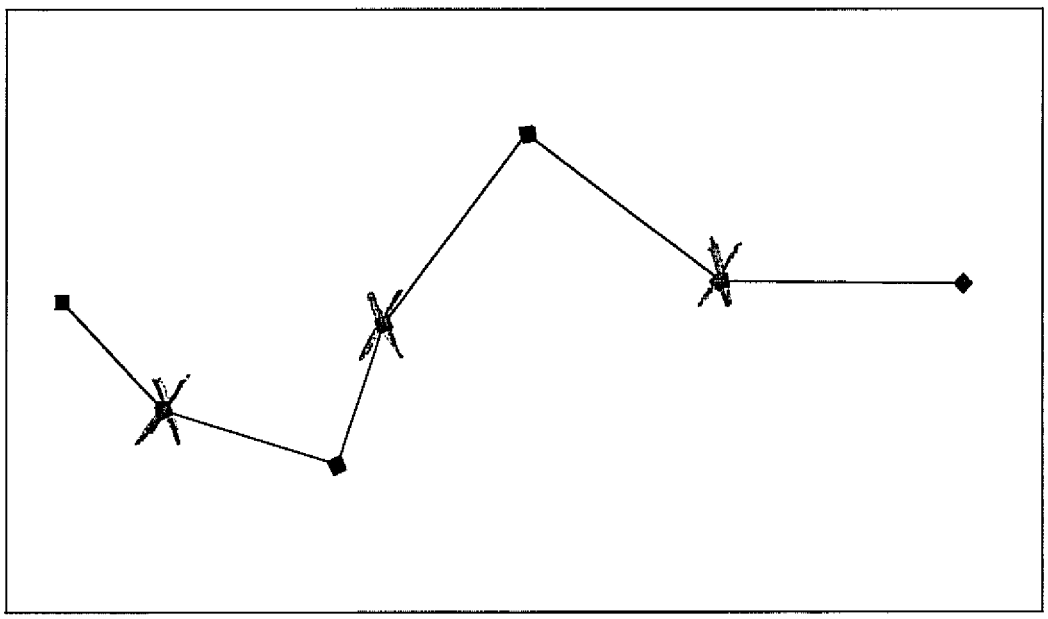
FIG. 10 shows points selected for removal.
Figure 11:
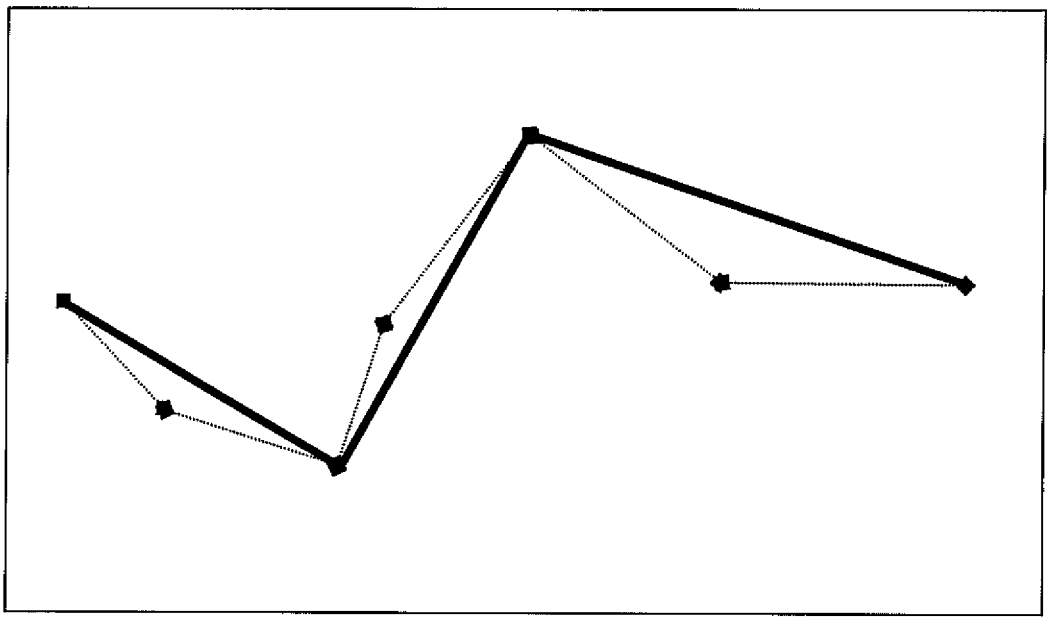
FIG. 11 shows a point removal example as an approximation of a geographic feature.
Figure 12:
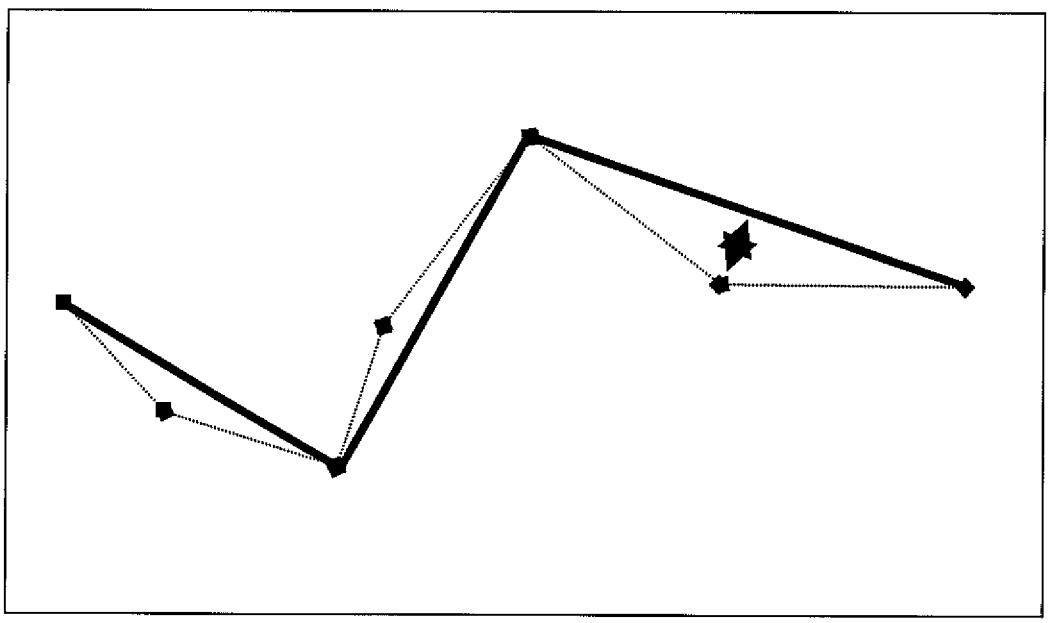
FIG. 12 shows a point removal example generating a measure of the accuracy of the approximation.

In this method:
1) A set of line segments representing a geographical feature is considered.
2) One or more points defining the line segments are identified for removal (the Xs in FIG. 10).
3) A new set of line segments is constructed using the remaining points, which approximates the original set of line segments (FIG. 11).
4) A measure is generated of the nearness of the new set of line segments to the old set of line segments.
5) The measure is compared to a standard, and if the standard is met or exceeded, then the new set of line segments is used rather than the old set. Note that the standard may vary depending on map scale, user preferences, or other criteria. In FIG. 12, for example, the star-shaped symbol is used to show a relatively large deviation from actual which may not conform to a given standard.
6) The points of the new line segments are sent from the server to the client
7) A graphical representation of the new line segments are constructed by the client.

This method may be applied when a user requests a map, or various approximate maps may be generated and later used upon user request.

Data Compression Embodiment

In order to reduce the amount of data sent with a WCS navigator, a variety of data compression algorithms may be used. Common examples of such algorithms include the Lempel-Ziv algorithm, the DEFLATE algorithm, the Lempel-Ziv-Welch algorithm, and LZ-Renau algorithm, although this method is not intended to be limited to these particular algorithms. The data compression method is to use a data compression algorithm to reduce the amount of data transmitted in a WCS navigator.

I claim:

1. A method of reducing data transmission in a wireless client-server navigation system, wherein map coordinates are represented as longitude and latitude, the method comprising the steps of:
  providing a wireless client-server navigation system wherein clients in the form of mobile units communicate with a server;
  receiving, at the server, a request for data representative of a map from a mobile unit, and performing the following steps at the server:
  obtaining data describing a map with features composed of line segments interconnecting successive pairs of feature points defined by a consecutive list of coordinates;
  partitioning the map into a plurality of tiles;
  designating a reference point with coordinates for each tile;
  computing a set of offset coordinates for each feature point in each tile from its respective reference point;
  computing, for each offset coordinate, an approximated offset coordinate in integer format, with the integer format representing a multiple of a distance, and replacing each offset coordinate with the approximated offset coordinate computed for that offset coordinate;
  constructing line segments between each point within each feature, generating a measure of nearness between the points and the constructed segments, comparing the measure of nearness to a standard and, for each point, if the measure of nearness meets or exceeds the standard, removing that point from the feature to create an approximated tile; and
  transmitting data representing each of the approximated tiles from the server to the mobile unit issuing the request.

2. The method of claim 1, wherein the tiles are substantially equal in size.

3. The method of claim 1, wherein the offsets are represented with Cartesian coordinates.

4. A method of reducing data transmission in a wireless client-server navigation system, comprising the steps of:
  providing a wireless client-server navigation system wherein clients in the form of mobile units communicate with a server;
  receiving, at a server, a request for data representative of a map-related feature from a mobile unit, and performing the following steps at the server:
  obtaining data describing the feature in the form of line segments interconnecting points having coordinates;
  partitioning the feature into a plurality of tiles;
  approximating the feature with a smooth, one-dimensional curve defined by an algorithm and a number of parameters;
  determining a distance standard based upon map scale regarding the extent to which the algorithm and parameters will affect the approximation of the feature; and
  if the approximation meets or exceeds the standard, forwarding the parameters to the mobile unit issuing the request:
  constructing the curve at the mobile unit using the transmitted parameters; and
  displaying the curve at the mobile unit.

5. The method of claim 4, wherein the parameters includes the coordinates of points along the curve.

6. The method of claim 4, wherein the algorithm is a mathematical function.

7. The method of claim 4, wherein the curve is a Bezier or other spline, a polynomial or fractal curve.

8. A method of reducing data transmission in a wireless client-server navigation system, comprising the steps of:
  providing a wireless client-server navigation system wherein clients in the form of mobile units communicate with a server;
  receiving, at a server, a request for data representative of a map-related feature from a mobile unit;
  obtaining data describing the feature in the form of line segments interconnecting points having coordinates;
  removing one or more of the points having coordinates;
  approximating the feature with line segments interconnecting the remaining points;
  determining a distance standard for the purpose of discriminating between acceptable and unacceptable point removal, and wherein the distance standard is based upon map scale and the extent to which the algorithm and parameters will affect the approximation of the feature;
  generating a measure of the distance between the original and approximated feature using one or more distances of removed points to the nearest line segment in the approximated feature;
  if the measure meets or exceeds the standard, forwarding the approximation to the mobile unit issuing the request; and
  displaying the approximated feature at the mobile unit.

9. A wireless client-server navigation system, wherein map coordinates are represented as longitude and latitude, the system comprising:
  a mobile unit including:
    a wireless transmitter for transmitting a request for data representative of a map,
    a receiver for receiving the data representative of the map, and
    a display for displaying the map; and
  a server including:
    an input for receiving data describing a map with features composed of line segments interconnecting successive pairs of feature points and defined by a consecutive list of coordinates,
    a receiver for receiving the request from the mobile unit,
    a processor for performing an operation on the data describing the map associated with the request by the mobile unit to generate data representative of the map in a data-reduced format, wherein the operation includes:
      partitioning the map into a plurality of tiles;
      designating a reference point with coordinates for each tile;
      computing a set of offset coordinates for each feature point in each tile from its respective reference point;
      computing, for each offset coordinate, an approximated offset coordinate in integer format, with the integer format representing a multiple of a distance, and replacing each offset coordinate with the approximated offset coordinate computed for that offset coordinate;
      constructing line segments between each point within each feature, generating a measure of nearness between the points and the constructed segments, comparing the measure of nearness to a standard and, for each point, if the measure of nearness meets or exceeds the standard, removing that point from the feature to create an approximated tile; and a transmitter for transmitting the data representative of each of the approximated tiles to the mobile unit.

10. A wireless client-server navigation system, comprising:

a mobile unit including:
   a wireless transmitter for transmitting a request for data representative of a map-related feature,
   a receiver for receiving the data representative of the map-related feature, and
   a display for displaying the feature on a map; and
a server including:
   an input for receiving data describing a map-related feature in the form of line segments interconnecting points having coordinates,
   a receiver for receiving the request from the mobile unit,
   a processor for performing an operation on the data describing the map-related feature associated with the request by the mobile unit to generate data representative of the feature in a data-reduced format, wherein the operation includes:
      approximating the feature with a smooth, one-dimensional curve defined by an algorithm and a number of parameters,
      determining a distance standard based upon map scale regarding the extent to which the algorithm and parameters will affect the approximation of the feature;
   a transmitter for transmitting the data representative of the map feature in the data-reduced format to the mobile unit if the distance measure meets or exceeds the standard; and
   a processor at the mobile unit for constructing the curve based upon the data representative of the map feature in the data-reduced format; and
   a display at the mobile unit for displaying the curve to a user.

11. A wireless client-server navigation system, comprising:

a mobile unit including:
   a wireless transmitter for transmitting a request for data representative of a map-related feature,
   a receiver for receiving the data representative of the map-related feature, and a server including:
   an input for receiving data describing a map-related feature in the form of line segments interconnecting points having coordinates,
   a receiver for receiving the request from the mobile unit,
   a processor for performing an operation on the data describing the map-related feature associated with the request by the mobile unit to generate data representative of the feature in a data-reduced format, wherein the operation includes:
      computing, for each coordinate, an approximated offset coordinate in integer format, with the integer format representing a multiple of a distance, and replacing each coordinate with the approximated offset coordinate computed for that coordinate;
      constructing line segments between each point within each feature, generating a measure of nearness between the points and the constructed segments, comparing the measure of nearness to a standard and, for each point, if the measure of nearness meets or exceeds the standard, removing that point from the feature to create an approximated tile;
   a transmitter for transmitting data representative of the approximated tiles to the mobile unit if the measure of nearness meets or exceeds the standard; and
   a display at the mobile unit for displaying the map feature in a data-reduced format using the approximated tiles.

* * * * *